(12) United States Patent
Cai et al.

(10) Patent No.: US 6,790,181 B2
(45) Date of Patent: Sep. 14, 2004

(54) OVERLAPPED SCANNING FOR MULTI-DIRECTIONAL COMPOUNDING OF ULTRASOUND IMAGES

(75) Inventors: Anming He Cai, San Jose, CA (US); Rickard C. Loftman, Mountain View, CA (US)

(73) Assignee: Acuson Corporation, Mountain View, CA (US)

( * ) Notice: Subject to any disclaimer, the term of this patent is extended or adjusted under 35 U.S.C. 154(b) by 186 days.

(21) Appl. No.: 10/243,453

(22) Filed: Sep. 13, 2002

(65) Prior Publication Data

US 2004/0054284 A1 Mar. 18, 2004

(51) Int. Cl.⁷ ................................................ A61B 8/00
(52) U.S. Cl. ...................................................... 600/443
(58) Field of Search ................................ 600/437–472; 367/7, 11, 130, 138; 128/916; 73/625, 626

(56) References Cited

U.S. PATENT DOCUMENTS

| | | |
|---|---|---|
| 5,148,810 A | 9/1992 | Maslak et al. |
| 5,235,986 A | 8/1993 | Maslak et al. |
| 5,261,408 A | 11/1993 | Maslak et al. |
| 5,798,461 A | 8/1998 | Banta, Jr. et al. |
| 6,117,081 A | 9/2000 | Jago et al. |
| 6,126,598 A | 10/2000 | Entrekin et al. |
| 6,126,599 A | 10/2000 | Jago et al. |
| 6,135,956 A | 10/2000 | Schmiesing et al. |

Primary Examiner—Ali Imam

(57) ABSTRACT

An image formed from compounded frames of ultrasound data acquired with different steering angles is displayed. Each component frame is associated with a scan of the entire displayed region. A majority of scan lines for each component frame are pointed in one direction or the same relative direction, and a minority of the scan lines are steered at different angles within each component frame to scan the rest of the display region, but with a different steering angle for the majority of scan lines of each of the component frames. As a result, the benefits of spatial compounding component frames associated with different steering angles are provided without having to apply filtering to reduce line artifacts.

22 Claims, 3 Drawing Sheets

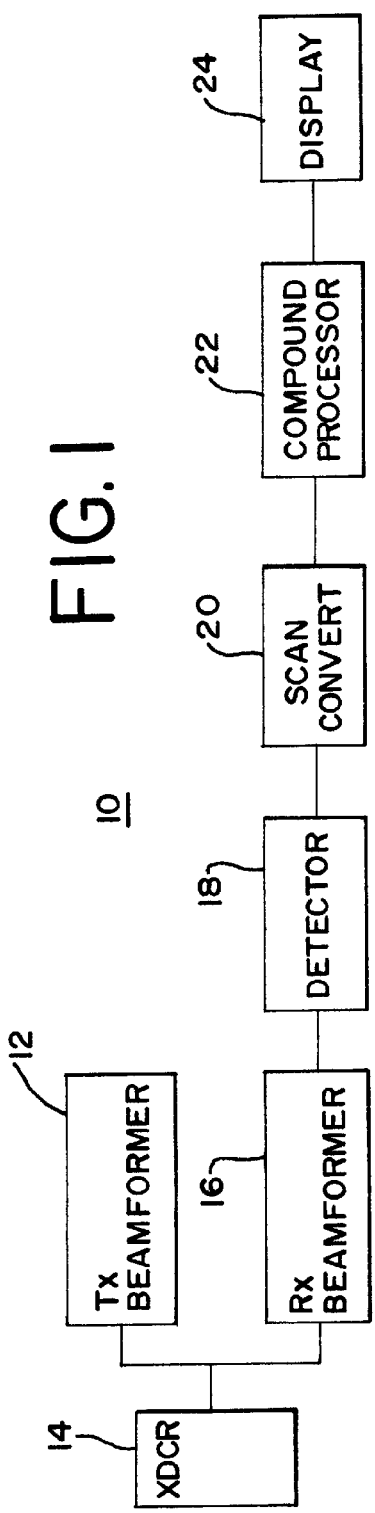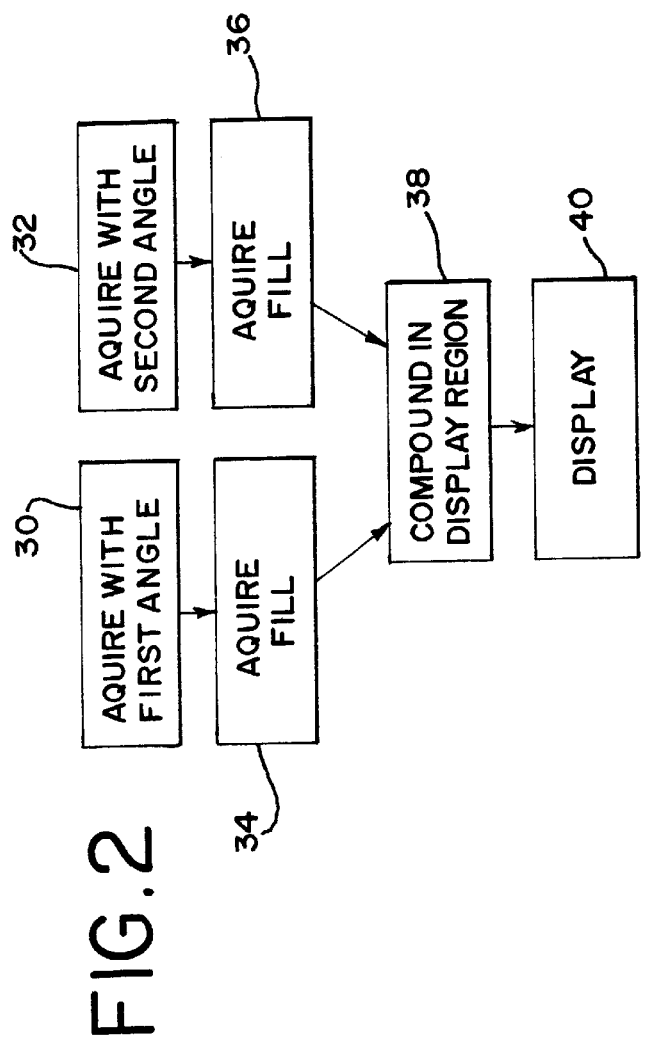

OVERLAPPED SCANNING FOR MULTI-DIRECTIONAL COMPOUNDING OF ULTRASOUND IMAGES

BACKGROUND

The present invention relates to spatial compounding. In particular, the present invention relates to compounding component frames of data associated with different steering angles to reduce speckle.

One component frame of data is acquired by scanning along scan lines at one angle relative to a transducer. A second frame of data is acquired by scanning along scan lines at a different angle. Each of the frames of data represents a different but overlapping region of a patient due to the angle of the scan lines. The frames of data are compounded together and displayed as an image. A line artifact exists where the region of the display image transitions from areas associated with different numbers of component frames of data. A leftmost portion of the display image corresponds to a single component frame. A center, lateral or azimuth position near the transducer is associated with all of the component frames.

In order to avoid the line artifacts, the compounded information is filtered. For example, a low-pass filter is applied to data representing spatial locations on each side of the line artifact. Further minimization of the line artifact is provided by averaging, such as normalizing the combined data by the number of component frames associated with any spatial location. Data for each spatial location is pre-weighted with a weighting factor that is a function of the number of component frames used to represent that spatial location. However, the process of normalization and filtering or smoothing the transition between different numbers of frames is complex or computationally excessive. Since the preweights change as a function of the number and spatial orientation of the various component frames, the frame rate of the compounded images may be limited.

BRIEF SUMMARY

The present invention is defined by the following claims, and nothing in this section should be taken as a limitation on those claims. By way of introduction, the preferred embodiments described below include methods and systems for displaying an image formed from compounded frames of ultrasound data acquired with different steering angles. Each component frame is associated with the scan of the entire displayed region, but with one or more different steering angles. For example, one frame of data is associated with no steering angle (e.g. scan lines normal to the transducer). Other frames of data have scan lines with different steering angles or steering angles adjusted from the steering angles of a nominal format. For some types of scanning, a majority of scan lines for each component frame are pointed in one direction (linear) or the same relative direction with a common scanning apex (sector, curved-linear, or Vector®) scanning), and a minority of the scan lines are steered at different angles within each component frame to scan the rest of the display region. As a result, the benefits of spatial compounding component frames associated with different steering angles are provided without having to apply filtering to reduce line artifacts. For other types of scanning (e.g. curved-Vector®), each component frame of data has steering angles that change as a function of lateral position of the scan line. The scan lines of each component frame are at different angles than scan lines of another component frame of data. For example, one frame of data corresponds to a nominal scan line format, such as no steering or a specific steering pattern. Other frames of data have non-nominal scan line formats, such as one or more scan lines at adjusted or different steering angles.

The transmit and receive beamformers control the scanning format and the direction of the scan lines so that two or more frames represent the entire display area but different steering angles. A compound processor combines component frames for each spatial location within the display region. Each of the component frames for combining by the compound processor includes data representing the entire displayed region.

Further aspects and advantages of the invention are disclosed below in conjunction with the preferred embodiments.

BRIEF DESCRIPTION OF SEVERAL VIEWS OF THE DRAWINGS

The components and the Figures are not necessarily to scale, emphasis instead being placed upon illustrating the principles of the invention. Moreover, in the Figures, like reference numerals designate corresponding parts throughout the different views.

FIG. 1 is a block diagram of one embodiment of an ultrasound system for compounding fully overlapped component frames.

FIG. 2 is a flow chart diagram of one embodiment for compounding frames of data associated with different steering angles but fully overlapping the same display area and for displaying a compound image representing the display area.

DETAILED DESCRIPTION OF THE PREFERRED EMBODIMENTS

Figure 3A:
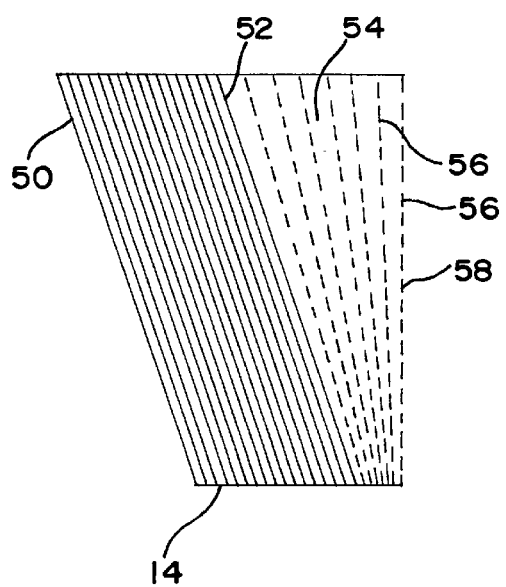
FIGS. 3A–C are graphical representations of embodiments of scan lines for three component frames in a linear scan format.

To simplify the compounding process, the scan lines of each component frame fully overlap or scan a region of the patient to be displayed. The fully overlapped scan patterns provide data representing each spatial location within a display region. Full overlapping provides for speckle reduction and uniform temporal resolution without pre-weighting or smoothing. Each component frame is associated with a different steering angle format or different steering angle(s). For example, one nominal component frame has a first steering angle format, such as scan lines at a normal angle to the transducer or non-steered scan lines. Other component frames have one or more, such as most, scan lines at different steering angles than the steering angle(s) of the nominal component frame (e.g. adjusting the steering angle based on the steering angle(s) of the nominal component frame). The difference in steering angles is implemented gradually as a function of lateral position to scan the entire display region. As another example, each component frame has a majority of scan lines with a common apex or a same steering angle to provide spatial diversity between frames, but additional scan lines at other angles to complete the scan of the display region. The scan line directions of each component frame are changed to scan the whole region to be displayed and avoid the partial overlapping provided by steering all the scan lines in each component frame in one direction. In alternative embodiments, preweighting and smoothing may be used with some of the component frames only partially overlapping or with some of the component frames completely sampling the region to be displayed.

FIG. 1 shows a system of one embodiment for compounding frames of ultrasound data acquired at different relative steering angles. The system 10 includes a transmit beamformer 12, a transducer 14, a receive beamformer 16, a detector 18, a scan converter 20, a compound processor 22 and a display 24. Different, fewer or additional components may be provided, such as using an offline workstation as a compound processor 22 and display 24 without the additional ultrasound acquisition components.

The transducer 14 comprises a one- or two-dimensional array of piezoelectric, ceramic, or microelectromechanical elements. In one embodiment, the transducer 14 is a one-dimensional array of elements for Vector®, linear, linear-Vector composite, Vector-sector composite, Vector-Vector composite, linear-sector composite, sector or other scan formats. In another embodiment, a curved array of elements is provided for curved sector, curved linear, curved Vector®, curved linear-curved Vector composite, curved Vector-sector composite, curved Vector-Vector composite, curved linear-sector composite or other scan format. The array of elements have a wavelength, half wavelength, or other sampling. A half-wavelength sampling of elements allows for greater steering angles, providing more spatial diversity for speckle reduction by compounding. The transducer 14 is operable to provide linear, sector, Vector®, curved-Vector®, other scan formats now known or later developed or combinations thereof.

The transmit beamformer 12 is one or more waveform generators for generating a plurality of waveforms to be applied to the various elements of the transducer 14. By applying relative delays and apodizations to each of the waveforms during a transmit event, a scan line direction and origin from the face of the transducer 14 is controlled. The delays are applied by timing generation of the waveforms or by separate delay components. The apodization is provided by controlling the amplitude of the generated waveforms or by separate amplifiers. To scan a region of a patient, acoustic energy is transmitted sequentially along each of a plurality of scan lines. In alternative embodiments, acoustic energy is transmitted along two or more scan lines during a single transmit event.

The receive beamformer 16 comprises delays and amplifiers for each of the elements in the receive aperture. The receive signals from the elements are relatively delayed and apodized to provide the scan line definitions or focusing similar to the transmit beamformer 12. The delayed and apodized signals are summed with a digital or analog adder to generate samples or signals representing spatial locations along the scan lines. Using dynamic focusing, the delays and apodizations applied during a given receive event or for a single scan line are changed as a function of time. Signals representing a single scan line are obtained in one receive event, but signals for two or more scan lines may be obtained in a single receive event.

The transmit and receive beamformers 12, 16 are operable to acquire a plurality of frames of data representing different overlapping regions or a same region of the patient. Each of the component frames are acquired without substantial movement of the transducer 14. Substantial is used herein to account for unintentional or slight movement of the transducer associated with a human holding the transducer, the patient breathing or being bumped.

Each component frame covers the entire display region. Overlapping regions include substantially an entire display region or a region to be imaged. Each frame of data corresponds to a different steering angle or steering angles, such as one frame of data having a majority of scan lines associated with a 5 degree left steering angle and another frame of data having a majority of scan lines associated with a 5 degree right steering angle. The component frames also include additional scan lines. These additional or fill-in scan lines cover areas of the display region which would otherwise be unscanned or unsampled due to the relative steering angles used. Each component frame includes none, one, two, or more fill-in scan regions. The additional scan lines and the fill-in regions may be generated in a sector, format with the apex of the sector at the face of the transducer collocated with the origin of the end or edge line of the scan lines associated with the desired steering angle, with a Vector® format with a virtual apex where the apex is behind the face of the transducer 14, with a linear format, or with steered scan lines without a common apex. In other embodiments, the steering angles change gradually as a function of position to scan an entire display region without additional scan lines directed to a fill-in region.

The detector 18 comprises a B-mode detector, Doppler detector or other detector. The detector 18 detects an intensity, velocity, energy, variants or other characteristic of the signals for each spatial location in the component frame.

The scan converter 20 comprises a processor, filter, application specific integrated circuit or other analog or digital device for formatting the detected data from a scan line format to a display or Cartesian coordinate format. The scan converter 20 outputs each component frame in a display format where each component frame has the same number of pixels representing the same displayed region. The component frames may additionally include pixels outside of the display region. In one embodiment, each component frame has the same number of pixels and an associated image geometry corresponding to the display region.

The compound processor 22 comprises one or more memories, processors, digital signal processors, application specific integrated circuits, multiplexers, multipliers, adders, and lookup tables and combinations thereof. The compound processor 22 is operable to combine or compound to or more frames of data representing at least a same region for display. For example, the compound processor 22 comprises a memory and multiplier for each of the component frames and a adder connected to each of the multipliers for combining signals representing a given spatial location from each of the component frames in a finite impulse response filter format. Linear or non-linear combinations of component frames may be provided.

The compound processor 22 is operable to combine detected and scan converted data. In alternative embodiments, the compound processor 22 is positioned between the detector 18 and scan converter 20 for combining detected but not scan converted data, positioned prior to a log compressor of the detector 18 for combining non-compressed information or positioned prior to the detector 18. Any of various embodiments for combining multiple data representing the same spatial location or various component frames may be used.

In one embodiment, an image display plane or memory is provided for each of the component frames, such as six display planes. Each display plane has foreground and background pages for allowing simultaneous writing to memory while reading out from memory, but other memory structures may be provided. The memory stores information for each spatial location, such as flow mode or Doppler mode parameter data, B-mode data, a color pan box information and the display region border information. One of the memories or image planes may be designated as a fundamental image plane, the scanning border of which is assigned as the display region. In alternative embodiments, the display region or border is assigned without reference to a specific component frame. In one embodiment, the memory of the compound processor 22 is operable to write zero values or otherwise remove information associated with spatial locations outside of the display region. For spatial locations within the display region, each component frame includes non-zero values, but some zero values may be provided. A filter responsive to different multiplier coefficients combines the component frames using different functions. For example, a component frame associated with minimal steering is weighted greater than other component frames, but equal weighting may be provided or other frames weighted greater. A lookup table provides the different weighting coefficients to the multipliers. Different coefficients may also be provided for combining different numbers of component frames.

The display 24 is a CRT, monitor, flat screen, LCD, projection or other display for displaying the compounded ultrasound image. The geometrical extent of the compounded ultrasound image is the displayed region of the patient. During the display refresh, the component frames are read, weighted, summed and thresholded to generate the image on the display 24. The display image format or display region is trapezoidal, trapezoidal like, rectangular, sector, pie shaped or other shape.

Figure 3B:
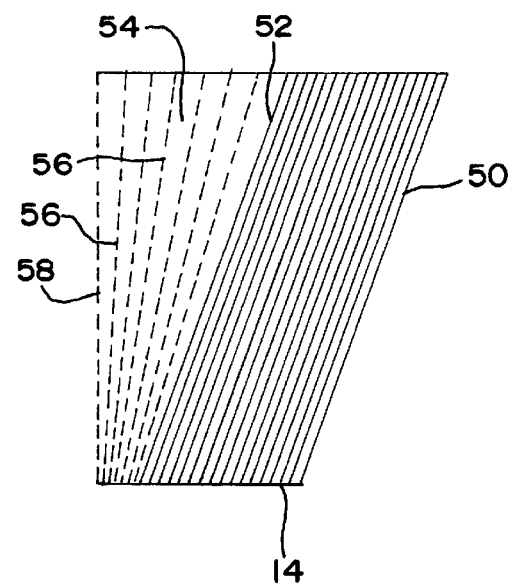
Figure 3C:
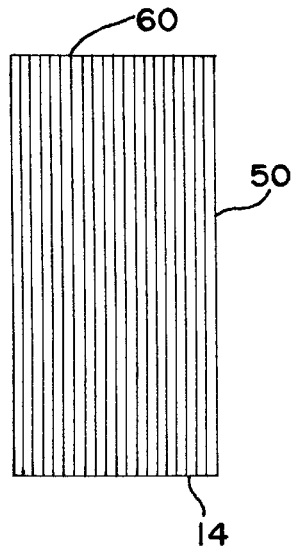

FIG. 2 shows one embodiment of a method for compounding frames of ultrasound data acquired at different steering angles and displaying a resulting compound image of only a display region. In acts 30 and 32, two or more frames of data are acquired representing the same or different regions. For example, FIGS. 3A, 3B, and 3C show the scan lines of three component frames of data each associated with a different region or scan geometry. FIGS. 3A, 3B and 3C show scan lines acquired with a linear transducer by steering at three different angles in a linear or generally rectangular scan format.

The region scanned for each of the frames of data corresponds to different steering angles. For example, FIG. 3A shows scanning with a majority of scan lines 50 pointed in a first direction, such as 10 degrees left from the transducer 14. FIG. 3B shows the majority of scan lines 50 pointed at a 10 degree right angle from the transducer 14. FIG. 3C shows majority of the scan lines 50 normal to the transducer 14. Different steering angles other than plus or minus 10 degrees and zero may be used with the 2, 3, 4 or more component frames. In one embodiment, one component frame is associated with the maximum angle of steering provided by the transducer 14 without undesired grading lobe effects. A second component frame is associated with the same angle but in a different direction relative to the transducer 14. Additional component frames, if any, are associated with lesser angles of steering. In alternative embodiments, the greatest steering angle is less than the maximum possible with the transducer 14.

Each of the majority scan lines 50 originates at a different position on the transducer 14, but two or more scan lines may originate from a same position. Using the linear format, each of the majority scan lines 50 are parallel and in a same direction relative to the intersections of the scan lines 50 with the origins on the transducer 14. The majority of the scan lines 50 of each component frame point in a same direction. The scan line density along the transducer surface is either uniform or changes as a function of the scan line position. The scan line density may be different for one frame of data as compared to another frame of data, such as having a different uniform densities or having differences in variation of the density.

The majority of the scan lines 50 may be acquired in any format, such as linear, curved linear, sector curved sector, Vector®, curved Vector® and combinations thereof. In the embodiment shown in FIGS. 3A–C, the majority of scan lines 50 have a common steering angle from a linear transducer 14. In an alternative embodiment shown in FIG. 4C, the majority of scan lines 50 have different angles from the face of the linear transducer 14. However, the different angles from the face of the transducer are associated with a common scanning apex position on or behind the transducer 14. As used herein, this common apex position provides a same relative steering angle. Relative is used to account for any slightly different angle with respect to the face of the transducer due to the common apex and any curve of the transducer between adjacent scan lines. The majority of scan lines 50 shown in FIG. 4C have a same steering angle. In one embodiment, additional component frames are acquired with different steering angles by moving the position of the apex laterally with respect to the transducer 14. In alternative embodiments shown in FIGS. 4A and 4B, the majority of scan lines 50 with a different steering angle than for the component frame shown in FIG. 4C are acquired with a linear format using parallel scan lines.

Figure 5:
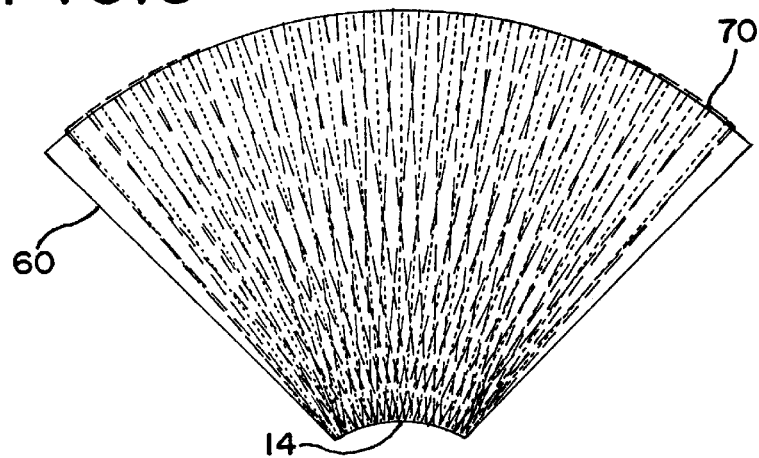
FIG. 5 is a graphical representation of one embodiment of the overlaid scan lines of three component frames of data acquired using a curved linear array.

FIG. 5 shows three component frames overlaid within a display region 70. Each of the component frames is associated with a curved-Vector® scan using a curved transducer 14. For each of the component frames, a common apex for the majority scan lines 50 is positioned at a different location along or behind the transducer 14 for different frames of data. Due to the curve of the transducer 14 and the apex position behind the transducer 14, one or more component frames may include scan lines with a same or different angle relative to the origins on the transducer 14 even with a sector or Vector® format. Using a curvilinear array, a zero degree steering angle provides scan lines that are orthogonal to the transducer array at the origin from the face of the transducer 14 or transducer surface. Thus, for a zero degree steering, each scan line extends at a normal from the face of the transducer 14 in a fan pattern associated with the common apex behind the transducer array. For non-normal angles, the shifted common apex results in a varied steering angles from the normal for each of the origins of the scan lines 50 given the curve of the transducer 14 (i.e. same relative steering angle). In alternative embodiments, a common apex is not used and the scan lines for each frame of data have varying angles. The steering angles vary differently for different frames of data, such as starting at a different angle for an edge line or having a different variation function of steering angle as a function of lateral position.

In acts 34 and 36, data for the component frame associated with filling in the scan format is acquired. FIG. 3C shows the scan lines 50 of a component frame entirely scanning the display region 60. The display region 60 is defined by the edge scan lines emanating from the transducer 14. As shown in FIGS. 3A and 3B, the edge scan lines 52 of the majority of scan lines 50 extend through the display region which would leave an area 54 associated with the display region unscanned since the majority of scan lines scan away from the portion 54. Additional scan lines 56, such as a minority of the total number of scan lines, with different steering angles scan the area 54 of the display region. Each of the component frames of FIGS. 3A and 3B have one fill-in portion, and FIG. 3C has no fill-in portions. In alternative embodiments, the display region extends on both sides of the majority of scan lines 50 of FIG. 3c, so that two fill-in portions are provided for one component frame.

In one embodiment, the additional scan lines 56 of the fill-in are 54 are acquired by gradually changing the steering angle from the steering angle used for the majority of the lines 50 adjacent to the edge scan line 52 to a steering angle corresponding to an edge of the display region, such as an edge scan line 58. The gradual change in a steering angle corresponds to a linear or non-linear function. In one embodiment, the additional scan lines 56 of the fill-in area 54 correspond to an additional sector scan format added for the fill-in area 54. The additional scan lines 56 may have a same origin at an edge of the transducer 14. For example, the majority of the scan lines 50 at the desired scan angle are acquired across the entire face of the transducer 14. The additional scan lines 56 are scanned at other steering angles and originate from the edge of the transducer 14. In alternative embodiments, such as shown in FIGS. 3A and 3B, the majority of the scan lines 50 extend from a portion of the length of the face of the transducer 14. The additional scan lines 56 extend from different origins along the remaining portion of the transducer 14. In this embodiment, the additional scan lines 56 are associated an apex position behind the transducer 14 or outside of the display region. The gradual change in steering angle for the additional scan lines 56 using different origins on the transducer 14 may avoid oversampling. The portion of the transducer 14 for the origins of the additional scan lines 56 is as small as possible, such as 20 percent of the aperture, to maximize the speckle reduction by spatial compounding but minimize over or undersampling. In other alternative embodiments, the scanning angle of the additional scan lines 56 is gradually changed without a common or changing apex.

Where the component frame shown in FIG. 4C also defines the region for display, the additional scan lines 56 have differing angles extending from the edge scan line 52 of the majority of scan lines 50 to an edge scan line 58 at a non-normal angle to the transducer 14. The additional scan lines 56 are acquired with a common apex as associated with a sector scan or with different steering angles and different apexes for each or groups of the additional scan lines 56.

For FIG. 5, the addition scan lines 56 are acquired by repositioning the apex. As a result, the majority of the scan lines 50 have a common apex and a minority of the scan lines have a different apex or different steering angles without a common minority apex. For example, fill-in areas to the left and/or right of the majority scan or lines 50 are acquired by shifting the apex along the azimuth or range dimensions from the common apex used for the majority scan lines 50.

The fill-in area 54 is scanned with a same or different scan format than the majority of scan lines 50. Any of the scan formats discussed herein may be used. None of the scan lines for one component frame overlap, but overlapping scan lines may be used. In one embodiment, the additional scan lines 56 of the fill-in area 54 are acquired as disclosed in U.S. Pat. No. 5,798,461, the disclosure of which is incorporated herein by reference.

In one embodiment, one or more of the common scan lines 50 or the additional scan lines 56 for the fill portion 54 originate beyond the lateral extent of the transducer 14. While data associated with such scan lines may have reduced intensity due to a limited transmit and receive apertures, the data provides information to complete the scan of the display region and avoid smoothing or other complex operations for compounding. Since the information is associated with edges of the display region, the decreased amplitude or increased noise due to greater amplification may be acceptable.

Figure 3D:
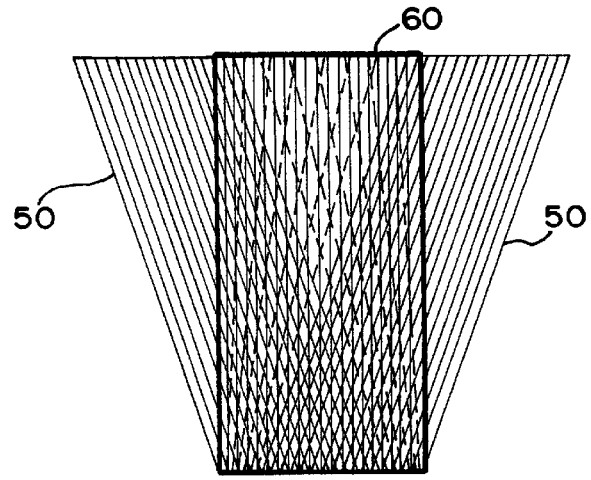
FIG. 3D is a graphic representation of the scan lines of the component frames of 3A–C overlaid or compounded.
Figure 4A:
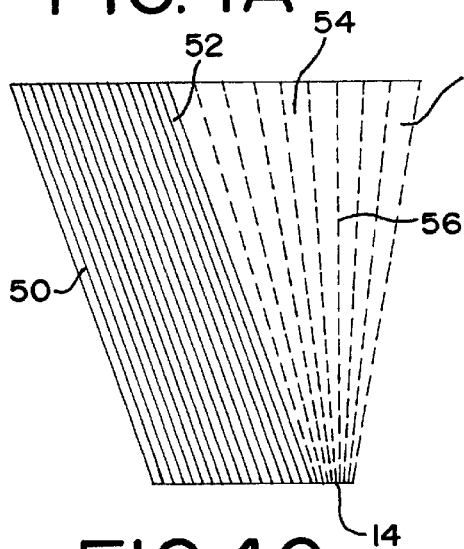
FIGS. 4A–C are graphical representations of embodiments of scan lines for three component frames in a sector or Vector® scan format using a linear transducer.
Figure 4B:
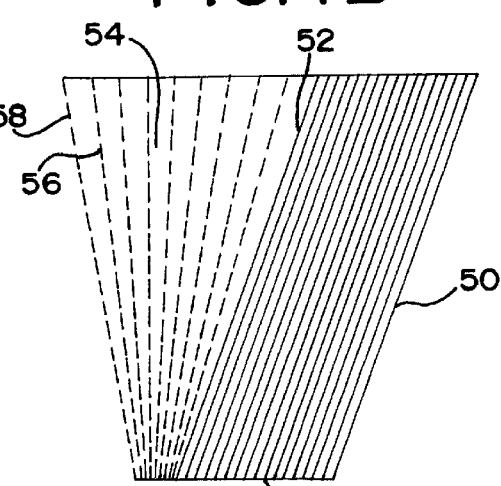
Figure 4C:
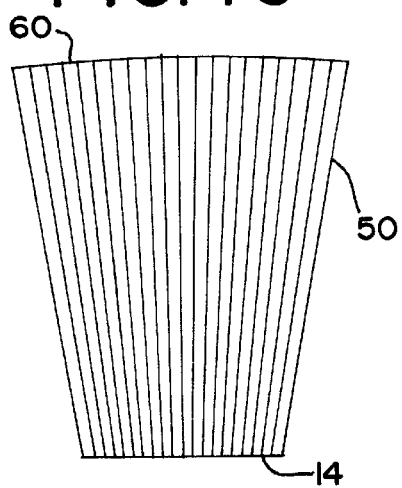
Figure 4D:
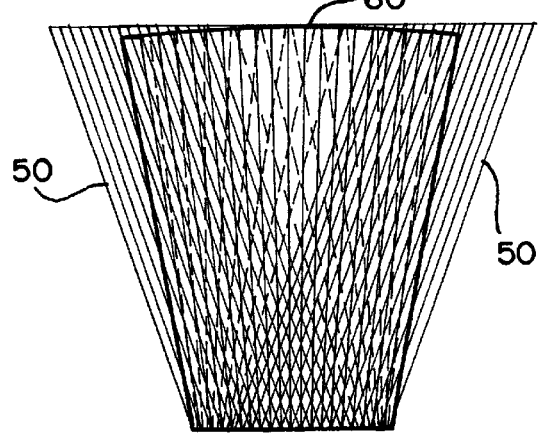
FIG. 4D is a graphical representation of the scan lines of the component frames of FIGS. 4A–C overlaid or compounded.

In one embodiment, one or more of the component frames, such as the component frame shown in FIGS. 3A and 4A, include scan lines 50, 56 both within the display region and outside of the display region. Where information is acquired outside of the display region 60 the information is discarded. For example, FIGS. 3D and 4D show scan lines 50 of two component frames outside of the display region 60. Data representing spatial locations along the portions of the scan lines 50 outside of the display region 60 are removed by masking, set to zero or are non-displayed values. In alternative embodiments, such as shown by the overlapping scan lines in FIG. 5, each of the component frames corresponds to scanning only in the display region without acquiring information outside of the display region.

Each of the component frames are compounded together for at least spatial locations representing the display region in act 38. In one embodiment, detected and scan-converted frames of data are compounded together. Since scan-converted information is used, the data of each of the component frames are in a same format and grid pattern or spatial location sampling. In alternative embodiments where data is compounded prior to scan conversion, interpolation, extrapolation or other processes are used to compound any data representing adjacent or similar but not identical spatial locations.

FIGS. 3D, 4D and 5, each show three component frames overlaid on each other. Each of the component frames includes data representing the entire display region 60. For compounding the component frames of FIGS. 3D and 4D, additional information outside of the display region 60 is discarded or not used for imaging for at least one spatially compounded image. As a result, the image displayed in act 40 represents only the display region. Subsequent images in a real time or non-real time format may use one or more of the same component frames again for generating additional compounded images, such as using a moving window for selecting component frames for compounding in a first-in first-out format. Alternatively, each component image is used for generating only one output compounded image.

In alternative embodiments, any of the various scanning methods and systems disclosed in U.S. Pat. Nos. 5,148,810, 5,235,986 and 5,261,408, the disclosures of which are incorporated herein by reference, may be used. The techniques disclosed in one or more of these patents show a Vector® scanning pattern using non-overlapping scanning lines for obtaining a wider field of view with a transducer. Any scan formats and apparatuses of one or more of the patents show the use of a common apex or vertex of the acoustic lines spaced behind the transducer 14, and the teachings therein may be used for positioning the common apex at different positions laterally along the transducer for obtaining component frames each associated with a different relative steering angle for the majority scan lines 50. In other alternative embodiments, any of the spatial compounding techniques and associated acquisition of component frames with different steering angles disclosed in U.S. Pat. Nos. 6,117,081, 6,126,598, 6,126,599, 6,135,956 and U.S. application Ser. No. 09/842,384, the disclosures of which are incorporated herein by reference, may be used.

Frequency compounding is provided in one embodiment. Frames associated with different steering are acquired in response to different frequency bands. The bandwidth and/or center frequency for transmit and/or receive for one or more frames of data is different than for at least one other frame of data. Data associated with different scan lines within a same frame of data may be responsive to different frequencies.

In one embodiment, different scan geometries are provided for real-time B-mode operation. The scan geometry (e.g. line origins and line angles) is varied between scans to achieve different "lines of sight" or steering angles. A nominal or primary scan geometry is provided, such as a standard scan format. The primary scan geometry may be expressed in various ways, such as steering angles relative to the transducer face and/or relative to a center line. Other scan geometries are perturbations from the primary scan geometry, such as adding a steering angle offset and an edge transition factor or function to the primary scan geometry. In one embodiment, only the steering angles are changed between each scan, but line origins may be changed in other embodiments. The steering angle(s) for the scans are calculated by adding an angle to one or both of the steering angles relative to the transducer face and relative to a center line. The angle to be added is calculated as asin(sin(steering angle offset)*ramp) where ramp is (⅓)x if x<½, 1−(⅓)x if ½<=x<1 and 1 if x>=1 and where x is (number of scan lines-1-scan line number)/(number of scan lines*edge transition function) if the steering angle offset is less than 0 and (scan line number/(number of scan lines*edge transition function) if the steering angle offset is greater than 0. A negative steering angle offset indicates a leftward steering. The functions used in this embodiment gradually reduce the steering angle offset at the inside steered edge to zero. The sin portion of the function is brought to zero over a fraction of the scan geometry defined by the edge transition function, such as 20% of the aperture. The steering angle offset is brought to zero as a piece-wise linear-quadratic function that is slope and value continuous, but other functions may be used.

While the invention has been described above by reference to various embodiments, it should be understood that many changes and modifications can be made without departing from the scope of the invention. For example, any of various scan formats may be provided where different propagation paths are used for a given spatial location in each of the component images. These different propagation paths correspond to different relative steering angles. Random, arbitrary or varying steering angles for scan lines throughout a component frame may be provided. It is therefore intended that the foregoing detailed description be understood as an illustration of the presently preferred embodiment of the invention, and not as a definition of the invention. It is only the following claims, including all equivalents, that are intended to define the scope of this invention.

What is claimed is:

1. A method for compounding frames of ultrasound data acquired at different steering angles, the method comprising:

(a) acquiring a first frame of data with a first plurality of scan lines covering an display region;

(b) acquiring at least a second frame of data with a second plurality of scan lines covering the display region, the second plurality of scan lines having at least one different steering angle than the first plurality of scan lines; and (c) compounding the first frame of data with the second frame of data for the display region.

2. The method of claim 1 wherein (a) comprises acquiring the first frame of data representing a first region, the first region including the entire display region, the first frame of data corresponding to a first relative steering angle, and (b) comprises acquiring the second frame of data representing a second region, the second region including the entire display region, the second frame of data corresponding to a second relative steering angle, the second relative steering angle different than the first relative steering angle.

3. The method of claim 2 wherein (a) comprises scanning the display region at the first relative steering angle with ultrasound, the first steering relative angle being for a first majority of scan lines of the first frame.

4. The method of claim 3 wherein (a) comprises scanning along scan lines wherein different steering angles for a minority of the scan lines, the different steering angles corresponding to scanning in a fill-in portion of the display region.

5. The method of claim 4 wherein (a) comprises gradually changing the different steering angles from the first steering angle to a steering angle corresponding to an edge of the display region without a common apex.

6. The method of claim 2 wherein (a) comprises scanning along ultrasound lines with a common apex for a majority of scan lines and from a different apex for a minority of scan lines.

7. The method of claim 1 wherein (a) comprises scanning along scan lines within the display region and outside of the display region;

further comprising:

(d) discarding data corresponding to spatial locations outside of the display region.

8. The method of claim 1 wherein (c) comprises compounding scan converted data.

9. The method of claim 1 wherein (c) comprises compounding detected data.

10. The method of claim 1 wherein (a) and (b) comprises acquiring the first and second frames of data with a transducer and without substantial movement of the transducer.

11. The method of claim 1 wherein (a) comprises scanning along first scan lines at the first relative steering angle, the first scan lines positioned across substantially the entire face of a transducer and scanning at other steering angles for at least one additional scan line originating from an edge of the transducer.

12. The method of claim 1 wherein (a) and (b) comprise acquiring with a linear transducer.

13. The method of claim 1 wherein (a) and (b) comprise acquiring with a curved transducer.

14. The method of claim 1 further comprising:

(d) displaying an image based on (c), the image representing only the display region.

15. The method of claim 1 wherein (a) comprises acquiring the first frame of data corresponding only to the display region and (b) comprises acquiring the second frame of data corresponding only to the display region.

16. The method of claim 1 wherein (a) and (b) comprise acquiring the first and second frames in response to first and second frequency characteristics, the first frequency characteristic different than the second frequency characteristic.

17. The method of claim 1 wherein (a) comprises acquiring the first frame of data with a scan line density that varies along a transducer surface as a function of the steering angle.

18. The method of claim 1 wherein (a) comprises acquiring with the first plurality of scan lines being normal to a transducer surface and (b) comprises acquiring with the second plurality of scan lines with a majority of the second plurality of scan lines being at angles other than normal to the transducer surface.

19. The method of claim 18 wherein (b) comprises acquiring with the second plurality of scan lines with gradually changing steering angles as a function of scan line position of the second plurality.

20. The method of claim 19 wherein (b) comprises acquiring with a scan line density along the transducer surface that varies as a function of the scan line position.

21. A system for compounding frames of ultrasound data acquired at different steering angles, the system comprising:
- a transducer;
- a transmit beamformer connected with the transducer;
- a receive beamformer connected with the transducer, wherein the transmit and receive beamformer are operable to acquire first and second frames of data representing first and second regions, respectively, both the first and second regions including substantially an entire display region, the first frame of data corresponding to a first relative steering angle and the second frame of data corresponding to a second relative steering angle different than the first relative steering angle; and
- a compound processor operable to compound the first frame of data with the second frame of data.

22. A method for displaying an image formed from frames of data acquired at different steering angles, the method comprising:
   (a) scanning a display region with ultrasound, a first majority of scan lines pointing in a first direction relative to one of a first common apex and intersection with a transducer;
   (b) scanning the display region with ultrasound, a second majority of scan lines pointing in a second direction relative to one of a second common apex and intersection with the transducer, the second steering angle different than the first steering angle;
   (c) compounding the first frame of data with the second frame of data for the display region; and
   (d) displaying an image based on (c), the image representing only the display region.

\* \* \* \* \*